(12) United States Patent
Munson

(10) Patent No.: US 7,231,541 B1
(45) Date of Patent: Jun. 12, 2007

(54) METHOD FOR PREDICTABLY FEEDING AND CONSUMING RAM MEMORY TO RECOGNIZE OVER-CONSUMPTION OF RESOURCES

(75) Inventor: Matthew Munson, Tustin, CA (US)

(73) Assignee: Unisys Corporation, Blue Bell, PA (US)

( * ) Notice: Subject to any disclaimer, the term of this patent is extended or adjusted under 35 U.S.C. 154(b) by 603 days.

(21) Appl. No.: 10/779,984

(22) Filed: Feb. 17, 2004

(51) Int. Cl.
*G06F 11/00* (2006.01)

(52) U.S. Cl. .............................................. 714/5; 714/4
(58) Field of Classification Search .................... 714/4, 714/5, 29, 54
See application file for complete search history.

(56) References Cited

U.S. PATENT DOCUMENTS

| | | | |
|---|---|---|---|
| 5,991,524 A | 11/1999 | Belkhale et al. | |
| 6,115,830 A | 9/2000 | Zabarsky et al. | |
| 6,163,855 A | 12/2000 | Shrivastava et al. | |
| 6,336,171 B1 | 1/2002 | Coskrey, IV | |
| 6,401,120 B1 | 6/2002 | Gamache et al. | |
| 6,490,610 B1 | 12/2002 | Rizvi et al. | |
| 2003/0120502 A1* | 6/2003 | Robb et al. | 705/1 |
| 2004/0123303 A1* | 6/2004 | Trotter | 719/315 |
| 2004/0133860 A1* | 7/2004 | Hieter et al. | 716/2 |

FOREIGN PATENT DOCUMENTS

JP 408062019 A * 3/1996

* cited by examiner

*Primary Examiner*—Dieu-Minh Le
(74) *Attorney, Agent, or Firm*—Alfred W. Kozak; Charles A. Johnson; Richard J. Gregson

(57) ABSTRACT

The present invention is a method for providing the consumption of a set amount of memory within a set amount of time in a server network in order to properly display the capabilities of running multiple applications proprietary suite of tools with the intention of being able to predictably trigger recovery events, and to discover when an application is "over-consuming" memory.

7 Claims, 12 Drawing Sheets

METHOD FOR PREDICTABLY FEEDING AND CONSUMING RAM MEMORY TO RECOGNIZE OVER-CONSUMPTION OF RESOURCES

CROSS-REFERENCES TO RELATED CASES

This application is related to a co-pending application U.S. Ser. No. 10/731,045 entitled "Method For Health Monitoring With Predictive Health Service In A Multiprocessor System", which is incorporated herein by reference.

This application is also related to U.S. Pat. No. 6,728,896 which issued on Apr. 27, 2004 and entitled "Failover Method Of A Simulated Operating System In A Clustered Computing Environment", which is incorporated herein by reference.

BACKGROUND OF THE INVENTION

1. Field of the Invention

The present invention provides a mechanism that arbitrarily consumes RAM memory on an associated server in a measurable and demonstration-friendly way.

2. Description of Related Art

A need arose to properly display the capabilities of the Unisys Server Sentinel suite of tools from the desire to be able to predictably trigger recovery events in a cluster load balancer environment. This need arose because it was necessary to create an application that would consume a pre-determined amount of memory at a pre-determined rate. Without this invention, it would be necessary to simply wait for a memory problem to occur. This may or may not ever happen naturally. Essentially, there was a need to be able to trigger events at any given moment, with a great deal of precision. During the rollout of the Unisys Dylan system, marketing wanted to be able to demonstrate the features included in a solution named "Application Sentinel". One of the features of application Sentinel is its ability to detect "rogue applications". These are applications that are consuming too many resources (such as memory or CPU time). When Application Sentinel sees a rogue application, it shuts it down and restores the monopolized resources to the system. The present invention simulates the conditions created by a rogue application, thus allowing the components of Application Sentinel to be demonstrated. A similar scenario can be concocted to explain the use of this invention in testing of development scenarios. If it is required that a rogue application be simulated to test the correctness of a software, this invention can also be used.

The Unisys ES7000 server is an Intel and Windows-based, partitionable, vertically scalable machine. The Unisys ES7000 server has proven ideal for general-purpose Windows server use for business intelligence and other applications, mission-critical data center use employing Windows Datacenter software, high availability and scalable clusters, server consolidation, disaster recovery, and more.

The solution for this problem (of finding applications consuming too many resources) began with creating a video playback mechanism. The reason video playback was incorporated was because the memory consumption application was intended to emulate a generic application that had "Gone rogue" and which was consuming memory rapidly. By including a video component, it was believed that the people viewing a demo, that included this technology, would, not only be visually pleasing, but also intuitively plausible as revealing a "memory consumer". Another way that the present invention is helpful is that it allows a user to simulate the persistence of a program state. "Program state" is the condition that a piece of software is in at any given time.

For example, a program could be open, with three particular files open within it. That is one state. If a user closed one file within the program, this would represent a different state. In general, programs have an infinite variety of states they can be in. When a computer program experiences an error and is forced to close down by either the operating system or another program, the program state is often lost. For example, if you are using a word processing program and do not save your work, a power outage will cause all of your work to be lost. Your word processor did not "persist" the program state.

The present invention simulates how a "program state" can be persisted in a crisis situation. If the software is closed by another piece of software, it can then be re-launched with the original program state still intact. By "original program state", it is meant to show the state that the program was in, immediately before it was forcefully shut down. Within the application, API calls were made that would arbitrarily consume memory at intervals determined by the user. The memory that is consumed is located in what is called the "heap". This is the place that dynamically created objects reside. Physically, this is RAM that is located on the motherboard of the computer in question. The user is empowered to not only chose the speed at which memory is consumed, but one can also set the amount of memory (in bytes) that is to be consumed at each interval of time. This allows an operator (with some experimentation) to predict the exact moment at which a memory threshold will be reached, which will cause a failover reaction.

This invention is useful because it allows an individual to manually trigger the execution of Unisys products contained in different software packages. In typical data center environments, it would be difficult to demonstrate some of the functionality of other Unisys software which typically would lay dormant until a catastrophe has arisen. This present software creates a catastrophe that other software responds to. By manufacturing a crisis, Unisys sales people and employees have the opportunity to display the capabilities of operating software, and to test them.

BRIEF SUMMARY OF THE INVENTION

In order to flush out unknown memory problems which can occur when certain applications "over consume" and monopolize memory to the detriment of other applications requiring memory resources, it was found desirable to create a resource usage application that could be used to consume a pre-determined amount of memory resources at a pre-determined rate. This new application can then be used to find those applications which were consuming memory at an unusually rapid rate which could subsequently overload memory and cause a shutdown. The ability is also provided to recapture the "program state" of an application just before it reaches the condition of failure.

It is therefore a development of the present invention to enable consumption of a set amount of memory within a set amount of time in a system which enables multiple applications to access memory resources. That this was hidden behind a video playback GUI is relevant to the presentation nature of the software. This, therefore, enables one the ability to view a program that was shut off automatically or manually because of problems, and to see exactly where it left off before it shut down.

This "persistence of state" is accomplished in a simple way. In the code for the software, there is an exit function which is called when the software is closed. It is called if the software is closed manually by the user, or automatically by an outside force. When the code in this exit function is executed, it examines the MPG file being displayed and determines which "frame" is being played. It also determines which MPG file is being played. It then writes this information to the system registry. When the program is restarted, it loads the MPG that was playing just before close, and then advances it to the frame that was being played. By doing this, it simulates how a program can persist its state during a forced shut down.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

GLOSSARY ITEMS

Figure 1A:
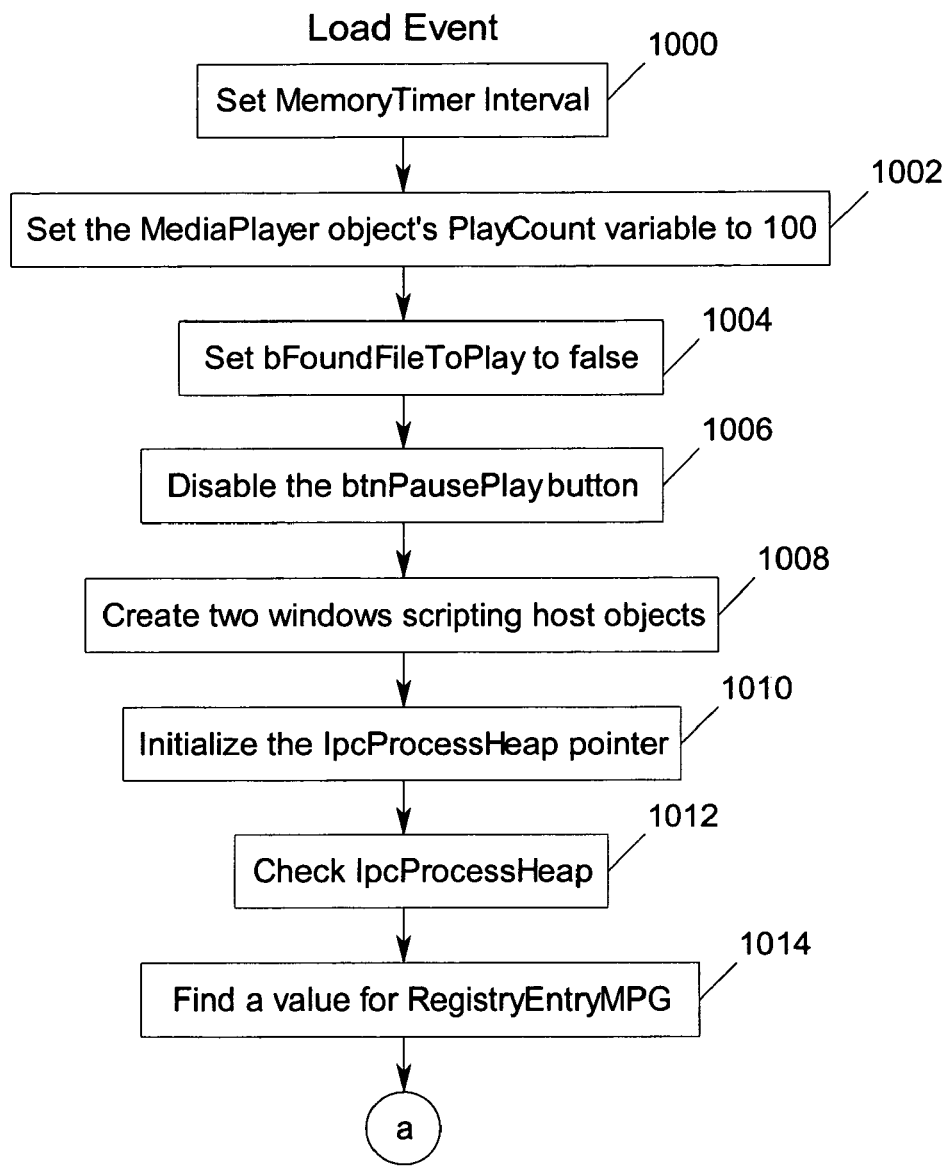
FIGS. 1A, 1B, 1C, and 1D are flowcharts that illustrate the process for loading an event.

1. Memory Soaker: This is the name of the application which contains the invention under discussion.
2. Memory Timer: This is the name given to a "Timer" object in the C# language. This timer was used in the creation of this invention. A timer object allows the programmer to execute compiled code after a certain amount of time has expired during the lifetime of the program.
3. MPG File: This is a file that is formatted to meet the standards as defined by the Motion Picture Experts Group. It is in essence a movie that can be played on a computer in a digital format.
4. MPG Movie: An alternate name for "MPG File".
5. Media Player: This is a tool that is included with many versions of the Microsoft Windows operating system (os). It allows users to play MPG Files on their computer.
6. Heap Memory: This is a logical area of memory in a computer that is designated by the operating system for the allocation of dynamic variables.
7. Memory Failover Event: This is a situation where enough memory has been consumed by running applications so that a warning message is issued by software such as the Unisys Predictive Health Program.
8. Recovery Events: This is the set of actions that are triggered once a Memory Failover Event has been issued. The Recovery Event fixes the problems that were created by the Memory Failover Event, and returns the environment to its previous condition. It is essentially the act of fixing the problems that were created by a Memory Failover Event.
9. API: This is an acronym for Application Programming Interface. It consists of a large library of programming functions that are native to the Microsoft Windows Operating System environment, but are exposed for programmers to use for their own development.
10. Server Sentinel: This is a product offered by Unisys that provides tools for managing a server. The Unisys Server Sentinel program works with the Unisys ES7000 Server to provide self-monitoring, self-confiigurating, predictive trends to stabilize proper (health) operations, and corrective facilities for multi-partitioned servers. This reduces management overhead while still increasing reliability and utilization of resources.
11. Server Sentinel Suite of Tools: These are the tools that comprise Server Sentinel.
12. Dylan System: This is a model of the ES7000 server that is sold by Unisys. To be specific, it is the ES7000/500. The Dylan model is different from the previous versions in that it is available in 8 processor modules. These modules can be purchased separately, and combined when necessary to form a larger unit. Earlier ES7000's shipped with all 32 processors on board, could allow a customer to "pay as they go".
13. Memory Threshold: This is the amount of memory that can be consumed by an application before a warning is issued by the system or a running software.
14. Failover Reaction: Once a memory threshold has been reached, a "Failover Reaction" will take place. This is where applications are moved from one cluster node to another.
15. Options (for setting memory consumption rate): There are four different settings for setting the rate at which memory is consumed. This rate tells the software how many kilobytes of memory to consume per second. These can vary from 100,000 bytes/second, to one million to five million, to ten million, to 50 million bytes/second.
16. Event: Quite simply, this is a discrete action that takes place either on a server, or within software. For example, and event could be when a block of memory is consumed. It could also be when an application is started, run, or closed.
17. Media Player Object: Microsoft exports numerous components for use by outside software developers. This particular component allows developers to use the functionality that is contained in their Media Player. The Media Player is a program that allows users to play music and video on their computer.
18. Soaker Application: This is the software that is described for finding applications that "over consume" memory resources.

Figure 5:
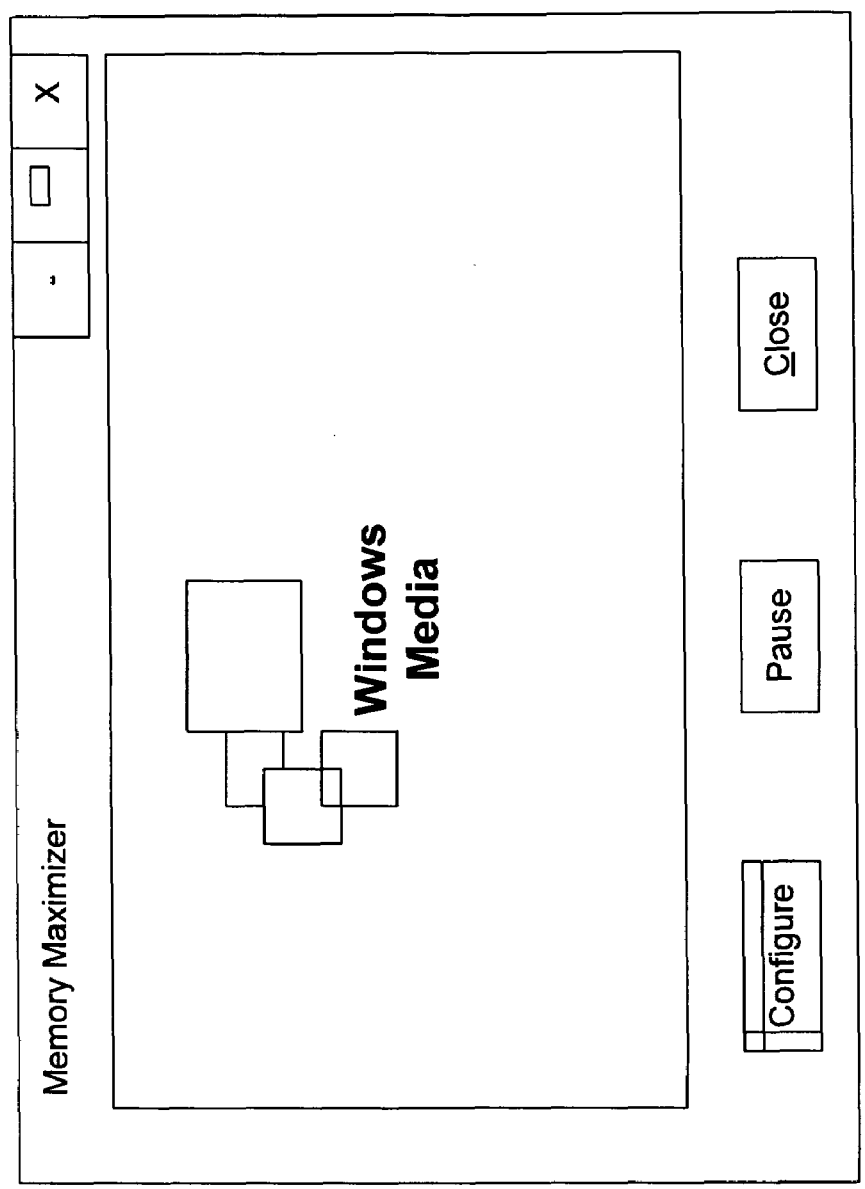
FIG. 5 is another screen console showing another phase of operation (Pause).

19. ES7000/500 (Dylan): A multi-partitioned server managing several different operating systems.
20. Play Count Variable (of Media Player): This variable indicates which frame is being played on the MPEG file that is currently loaded into the Windows Media Player. For example, on a one-minute movie, this variable could have a value anywhere between 1 (meaning the movie is currently on its first frame) or 1440 (in which case the movie would be on its last frame, assuming a 24 frame per second play rate.
21. bFoundFileToPlayVariable: This is a Boolean object in the invention which indicates if the software was able to find an MPEG file on the local system. The local system is the PC that the software is running on. This MPEG file will be used by the software to display a movie. The reason we display a movie is to display to the user that the application is doing work. On typical business applications, such as database applications, it is difficult to convey visually that the application is using system resources. The idea behind the invention is that it visually tells the user that the program is working, and that resources are being consumed.
22. btnPausePlayButton: This is a Boolean which indicates if the MPEG file is being played, or if it is paused. If it is being played, the movie is currently running. If it is paused, it is not.
23. IPC Process Heap Pointer: This is a pointer in the software that allows the program to have direct access to heap memory.
24. IPC Process Heap: This is the specific area of memory that is accessed by the software. This is where memory is consumed by the software.
25. Registry Entry MPG: software keeps track of the MPEG file that is being played by writing an entry in the system registry. This particular entry describes an absolute path to the MPEG File being used by the software. An absolute path is the opposite of a relative path. Where a relative path indicates the location of the file from the location of the executable (relative to the file hierarchy of the PC it is running on), the absolute path describes the path of the item from the highest level. For example, "C:\\docs\movies\temp\film\new.mpg" would be an absolute path, as it starts at the highest level of the file structure of the PC, where "..\film\new.mpg" is a relative path, as it describes the path to the movie relative the location of another file or executable.
26. Windows Scripting Host Objects: Microsoft has created a number of tools to allow programmers access to functionality that was written by them. One such tool is the "Scripting Host Object". When accessing this programmatically, a developer is given access to a number of useful file handling services. These file handling services allow a programmer to check for the existence of a file on a system, search for a file, check if a file is in use, and so on.
27. MPG To Play Object: In the memory soaker software, we keep track of the MPEG file that is going to be displayed in the main screen. This is a reference to the particular file that is to be played.
28. Memory Consumption Rate Variables: As there are four different speeds at which memory can be consumed, a choice was made to save those speeds within the soaker software. Each of these variables holds a numeric value which represents the total number of kilobytes of memory to be consumed per second.
29. bFoundFileToPlay: This is a Boolean value in the soaker software that tracks whether or not there is a valid MPEG file in existence that may be used by the software.
30. Paused or Playing Value: This is a reference to a variable in the soaker software that determines whether the selected MPEG file is currently playing, or if it is paused. This reference is described as "abstract" because there is no variable named "Paused or Playing Value", but this phrase refers to a variable that is named similarly in the invention.
31. System Registry: This is a database maintained by Microsoft Windows that is commonly used to hold small amounts of information about specific applications. Applications that run on Windows can access this database easily, and has therefore become the defacto method for persisting small amounts of data across application executions.
32. Main Window Display: This describes the primary interface for the soaker software. FIG. 5 illustrates this interface.
33. Variable Current Pos: This is an abstract reference to a variable in the soaker software which indicates the frame that the MPEG File is currently playing. This variable is used to restore the program after it has been shut down. This is done by advancing the MPEG file to the frame that was playing prior to shutdown. The actual frame number is described under glossary term "Play Count Variable".
34. FileName: This is a variable in the soaker software that keeps track of the MPEG file that is to be used. It is a string that contains an absolute path of the selected MPEG file. For example, the string "C:\\mydocs\movies\test_movie.mpg" could be held in the variable "FileName".
35. Media Player: This is software written by Microsoft that can be used to play audio and video files.
36. Memory Timer Object: This is an abstract reference to a timer object used by the soaker software. A time object allows a programmer to trigger the execution of code in their selected software after a specified period of time has elapsed.
37. Bytes To Allocate Variable: This is an abstract reference to a variable in the soaker software that indicates how many kilobytes of memory are to be consumed each second. This memory is the memory to be consumed by the soaker software.
38. Mem Rate SuperSoak: The soaker software has four default settings for memory consumption rate. This item is an abstract reference to the highest rate of memory consumption, "SuperSoak". This name is meant to indicate that the amount of memory that will be "soaked" (or consumed) is very high, for example 50 million bytes/second.
39. HeapAlloc( ) API: This is an API created by Microsoft which allows developers to allocate memory in the heap.
40. Unisys ES7000 Server: The Unisys ES7000 server is an Intel and Windows-based, partitionable, vertically scalable machine. The Unisys ES7000 server has proven ideal for general-purpose Windows server use for business intelligence and other applications, mission-critical data center use employing Windows Datacenter software, high availability and scalable clusters, server consolidation, disaster recovery, and more.
41. Cluster Load Balancer Environment: This is a configuration of both software and hardware wherein a number of processor are designated to run in a logical group known as a "cluster". Applications can be assigned to run on this cluster, meaning that they will only use the CPUs that are contained within that cluster. Multiple "clusters" are created. In a Cluster Load Balancer Environment, applications are passed among "clusters" in such a manner that ensures that the applications are performing at levels that are determined by an administrator. An administrator is an individual who is responsible for the configuration and set up of a system. "Levels" typically consist of metrics that are specific to applications that could be run on clusters. For example, if you are running a database program, one metric would concern "Transactions per second". The administrator may desire that the database program execute a certain number of transactions per second. By setting these levels, the administrator is instructing software to determine the cluster that the software will run on at any given moment in time.

42. Soaker Software: The software for presetting the amount of memory resource to be consumed from a MPG movie file in order to determine when a preset threshold has been reached.

43. Application Sentinel: This involves programs to evaluate and manage system resources where less important applications can be moved to another node having sufficient spare resources. It assists in optimizing and sealing ES7000 based SQL operations and for workload management.

44. Predictive Monitoring: monitoring of system metrics for conditions that indicate a potential future problem rather than a current failure. For example, a decreasing trend in the amount of available disk space indicates that the system may become unusable in the future if the trend continues.

45. Health Monitoring (multiprocessor system): Monitoring of system metrics to determine the usability and availability of the system.

46. Local System: system where a program has been started, in particular a system where the HealthMonitor service and the HealthEvents dll are installed and running.

47. Predictive Data: Monitored system health indicator that can be used to predict a potential future problem, for example the amount of available disk space remaining.

DETAILED DESCRIPTION

The "Memory Soaker" application has two purposes: to consume memory in a consistent, predictable, and configurable way, and to do it while presenting an MPG movie for view on a screen by observers. The motivation behind the creation of this software is to allow the recovery features of the Unisys Server ES7000/500 (Codename Dylan) to be demonstrated. However the inventive concept is not limited only to Unisys Servers.

When application software in a system consumes a certain amount of memory, another application (called the memory Soaker), which is monitoring "runaway" applications, will shut down the application being monitored. The application monitoring memory in this scenario is called "Predictive Health" program, and is part of the "Application Sentinel" suite. Upon re-launch, the memory soaker application needs to restore its "state" prior to a forced shut down. The amount of memory that is being consumed by software application is measured through PerfMon counters, which are part of the Microsoft operating system. These counters indicate how much total memory is in use. The Predictive Health program as indicated in U.S. Ser. No. 10/731,045, monitors these counters at regular intervals, and looks for unusual consumption rates.

An MPG (a video, such as the 30 second Unisys television commercial which explains Unisys check processing capabilities) is displayed in order to graphically display an application running. This also facilitates simulation of a software's ability to recover from a system shutdown. This is done via the restarting of the movie at the same point where it was originally stopped prior to shut down. In the software developed herein, the movie that is playing is a metaphor for work that is being done by a piece of software. For example, a database performs many operations while it is running. However, these operations are difficult to view. The movie-playing component of the software is meant to be a metaphor for the types of work that is being done by a database application. When a database application is closed down and restarted, ideally, the application would be restarted and the state of the application would be restored to what it was immediately prior to shut down. For example, if the database was performing a transaction for customer Y prior to shutdown, when the program was restarted, it would continue to process customer Y's request at the exact point it had left off prior to shut down.

In an attempt to extend the metaphor of work into the software, it was chosen to save off the location of the movie prior to shut down, and restart the movie at that exact point once the software was restarted. This is a good and useful metaphor for explaining the way an applications state can be "persisted" across automatic shut down and restart. In the case of the Memory Soaker applications, if the software is closed in the middle of the movie, then when it is re-launched, the movie will begin playing at the exact point it left off. This will happen if the software is shut down by the user (manually) or by an external piece of software (automatically). Memory consumption is performed by allocating blocks of memory on the heap (3002, FIG. 3). Every second, a block of pre-determined sized memory is allocated by the software. This allocation of memory simulates the behavior of a "rogue" application. Such an application has now experienced an internal error, and is consuming resources beyond what it was originally designed to do. The overall purpose of simulating this behavior is to provide an opportunity to display how the tools in Application Sentinel are capable of recovering a system from the often-disastrous effects of a rogue application. This process continues for every second that the MPG is playing.

Figure 4:
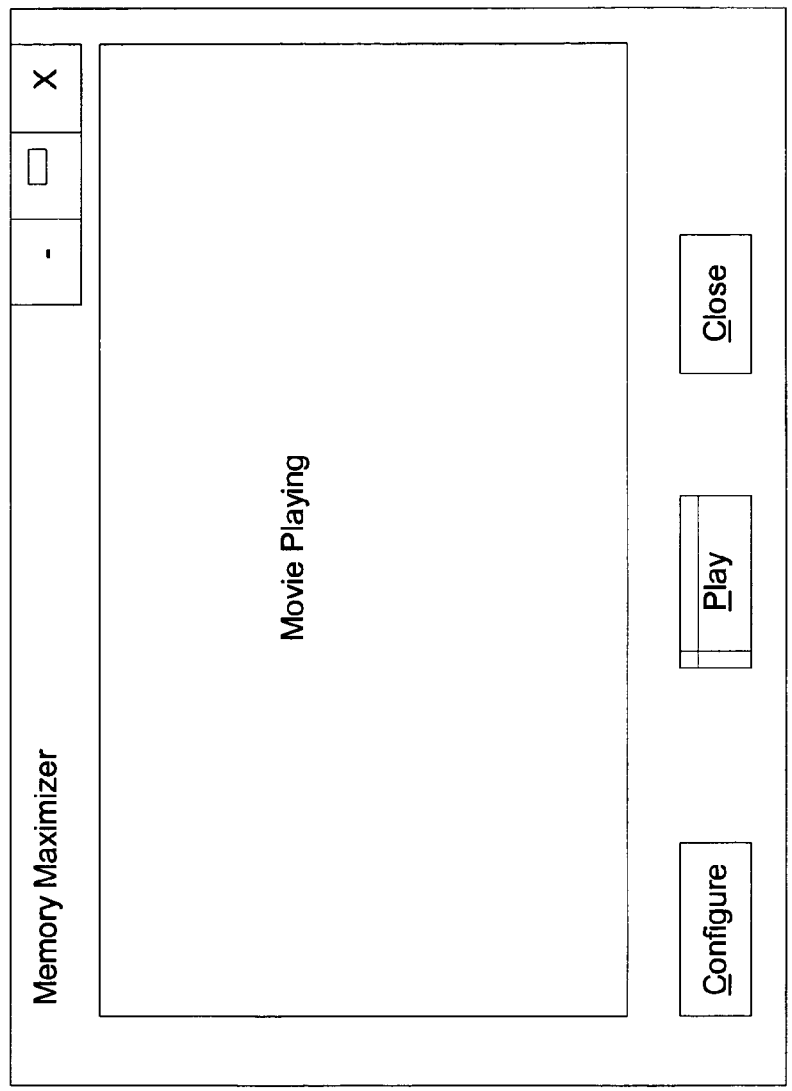
FIG. 4 is a screen console for managing a digital feed to memory.

FIG. 4 is an illustration of the screen for viewing the movie which has been fed as a digital stream. A Play-Pause button is used to play or stop the movie.

Note that when the MPG is paused, or if there is no MPG selected, memory consumption will not take place.

The "Memory Soaker" application has two purposes: to consume memory in a consistent, predictable, and configurable way, and to do it while presenting an MPG movie. One motivation behind the creation of this software is to allow the recovery features of the Unisys ES7000/500 (Codename Dylan) to be demonstrated.

When the software consumes a certain amount of memory, another application monitoring "runaway" applications will shut it down. Upon re-launch, the memory soaker works to restore its "state" prior to forced shut down.

An MPG is displayed in order to graphically display an application running. This also facilitates simulation of a software's ability to recover from a system shutdown. In the case of the Memory Soaker, if the software is closed in the middle of the movie, when it is re-launched, the movie will begin playing at the exact point it left off. Memory consumption is performed by allocating blocks of memory on the heap. Every second, a block of pre-determined sized memory is allocated by the software. This process continues for every second that the MPG is playing. Note that when the MPG is paused, or if there is no MPG selected, memory consumption will not take place.

Execution of the Memory Soaker program works as follows:

1. Program is launched. Initial dialog comes up with blank movie screen and three buttons. Buttons read "Configure", "Pause", and "Close". The "Pause" button is grayed out, as seen in FIG. 5.

2. At this point, the user has two options. They can quit the program by pressing the "Close" button (or the small "X" in the upper right hand corner). They can initialize the program by pressing the "Configure" button.

3. Pressing the "Configure" button launches a dialog, as seen in FIG. 6.

Figure 6:
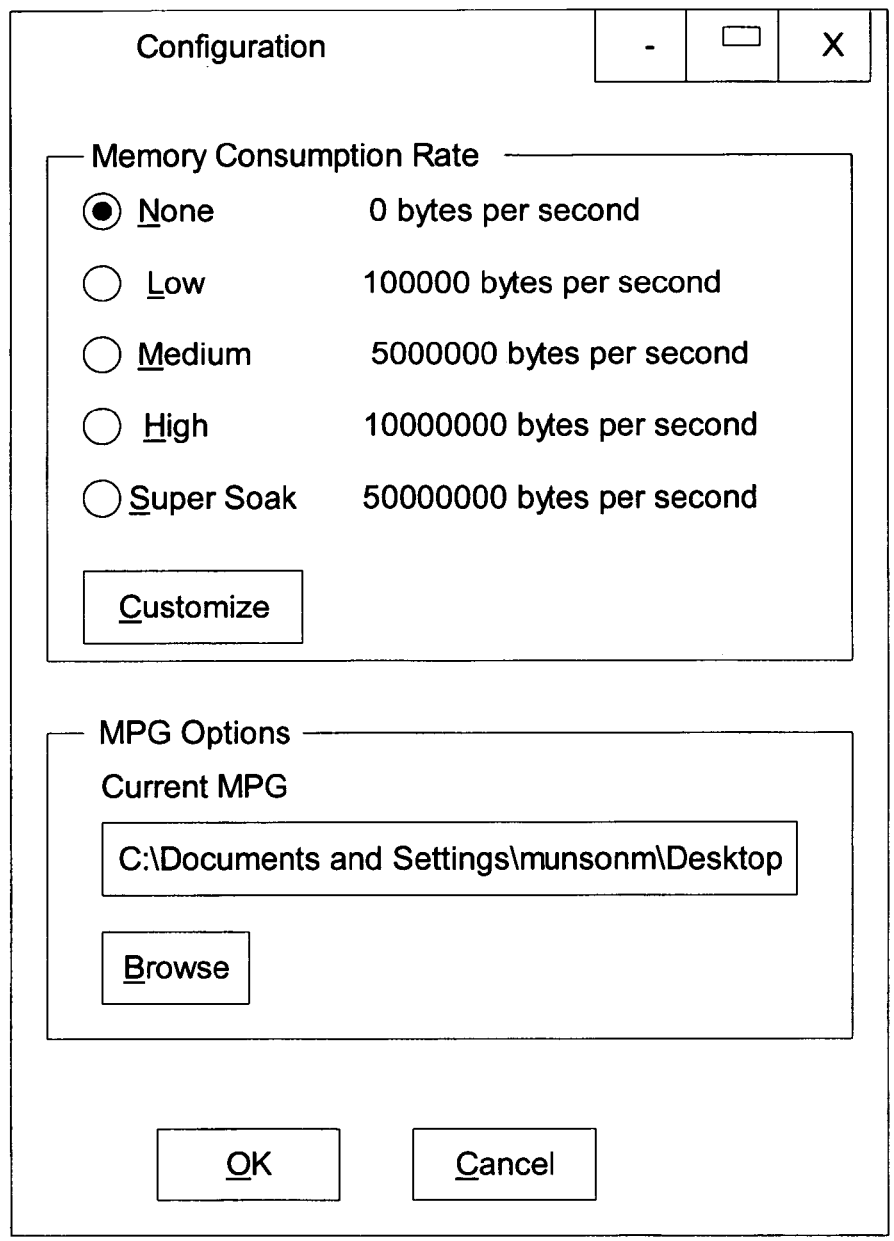
FIG. 6 illustrates the configuration dialog.

The dialog in FIG. 6 is broken up into two areas: "Memory Consumption Rate" and "MPG Options". "Memory Consumption Rate" allows the user to specify how fast memory will be consumed during the playing of the movie. The user can select from the following five options: None, Low, Medium, High, Super Soak. The user selects one of these options by clicking on the radio button associated with each item. A user cannot select more than one memory consumption rate. If the user wishes to define their own memory consumption rate, they can click on the "Customize" button. This opens a dialog box, which is illustrated in FIG. 7.

Figure 7:
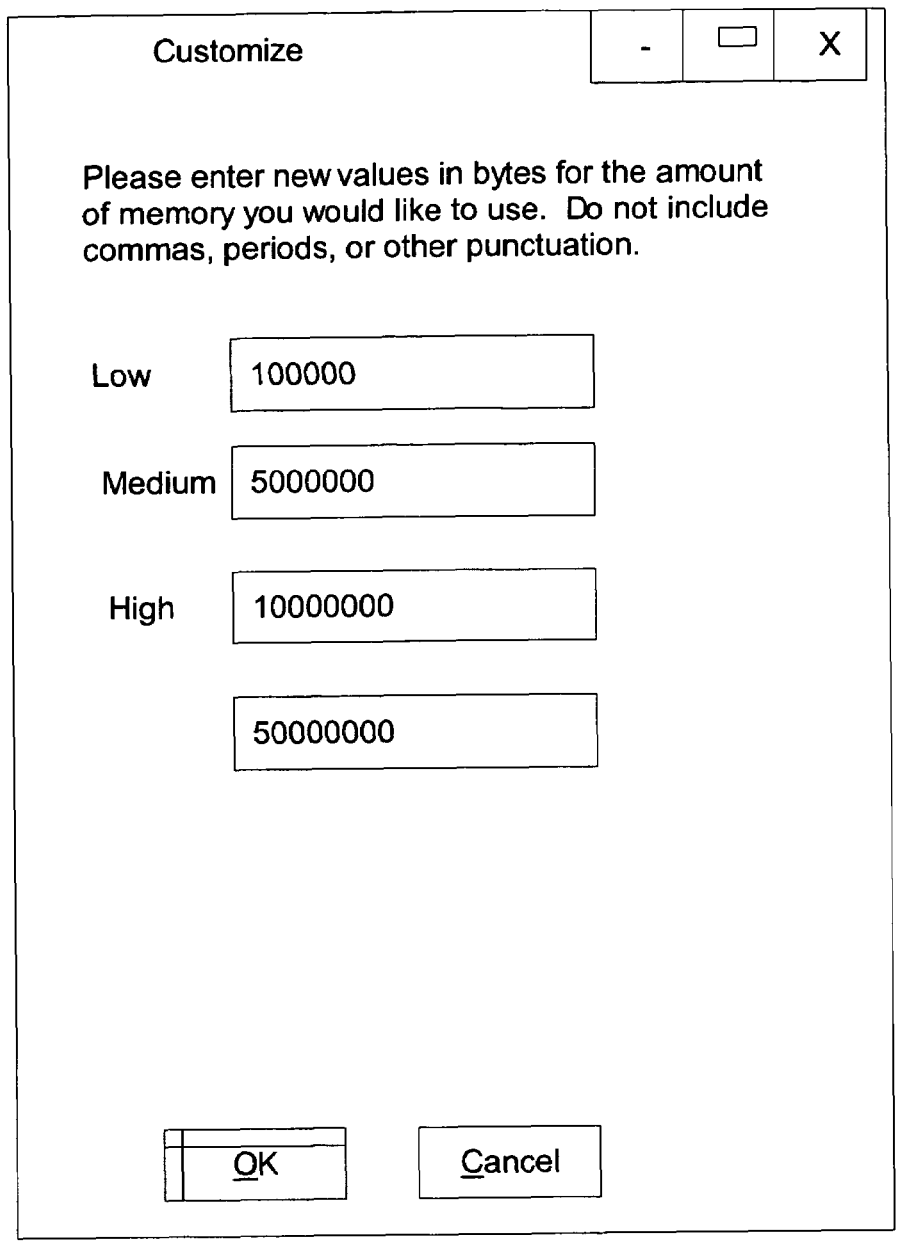
FIG. 7 shows the use of the customize button.

In FIG. 7, the user is instructed to enter a numeric value that will represent the number of bytes of memory to be consumed per second. Once new values are entered, the user can press OK to transfer these values over to the previous dialog. The user can also press Cancel, which will simply return them to the previous dialog without making any changes.

The MPG Options (FIG. 6) portion of the dialog is where the user is allowed to select an MPG to be played. MPG is a standard movie format supported by most computer systems. By pressing the "Browse" button, a standard windows dialog box is launched which displays a screen shot which is illustrated in FIG. 8.

Figure 8:
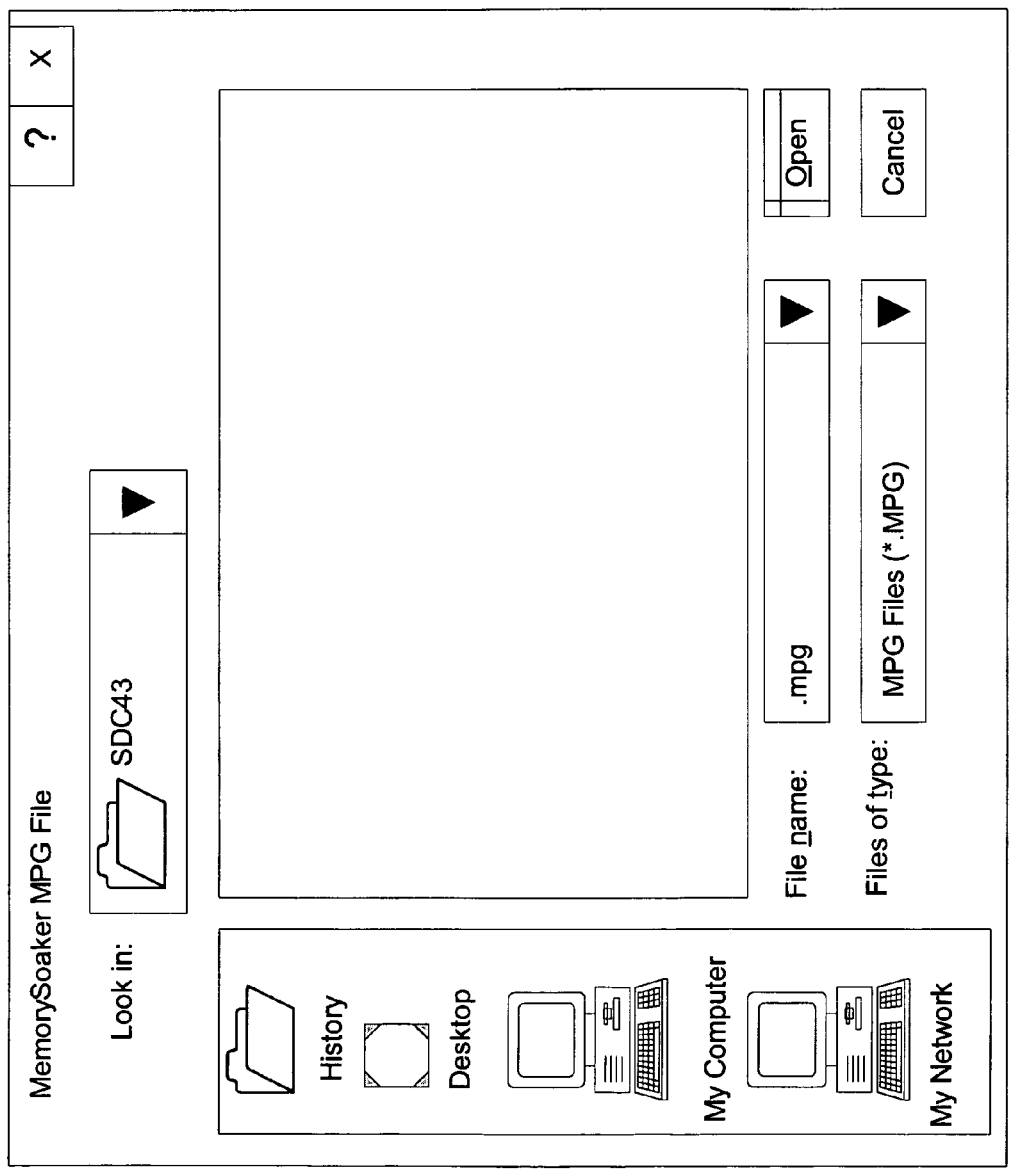
FIG. 8 shows the dialog screen for the browse button.

The screen in FIG. 8 allows the user to browse their hard drive or network for other MPG files that they may wish to play in the Memory Soaker application.

Once configuration (FIG. 6) is complete, the user can press OK to return to the main screen and save whatever changes they made, or they can press Cancel to return without saving the changes.

4. When the user returns to the main dialog, the movie that was selected in the configuration screen (FIG. 6) will begin playing, and memory consumption will begin. If no movie was selected, or an invalid path was entered for the MPG title, the program will remain in its initial state.

While the movie is playing (FIG. 5), the user has the option of pressing the "pause" button. When pressed, the movie stops playing and memory consumption ceases. When the pause button is pressed, the text on the center button changes to "Play", indicating that a movie is queued up and can be played at any time.

5. If the program is closed by the operating system for any reason, it records information about its state before closing. Upon closing, the software records the frame count of the MPG that is being played, along with the memory consumption rate that was set by the user. It also records whether or not it was closed by a user, or by the operating system (or some other means). Lastly, it records whether or not the movie was playing, or was paused. Incidentally, the "play" state of the movie dictates whether memory is being consumed or not. If a movie is playing, memory is being consumed. If the movie is paused, or if no movie has been selected, memory is not being consumed.

6. Upon launch, the program queries the system registry (3010, FIG. 3) to discover the method of shutdown during its last execution. If it turns out that the program was closed by the operating system or some other non-user intervention, the software will re-open the MPG that was previously playing, advance it to the recorded frame position, and begin playing it at that point. Also, the program will begin consuming heap memory at the rate determined during its previous execution.

The core of this application can be found in two functions. (i) The Load event (FIGS. 1A, 1B, 1C, 1D) for the main application window, and the (ii) MemoryTimer event function (FIGS. 2A, 2B). The load event sets up all of the variables for the execution, and makes sure that the program starts in its proper state. The state is important, as the program must re-initialize itself to its state prior to the most recent shut down. The load event also determines if the MemoryTimer function will be called. It is in the MemoryTimer that the memory consumption takes place. The MemoryTimer function will be called automatically every one second, and will consume the amount of memory that was specified by the user, and initialized in the load event.

The Load event operations for the main application window is indicated below:

This code is all executed before the application is launched and the main window is made visible.

1. Set "MemoryTimer" interval to 1000 ms, or 1 second. This is how often the timer will time out, and execute the code associated with the time. Essentially, this makes it so that the code associated with the timer will be executed every 1 second (1000, FIG. 1A).

2. Set the MediaPlayer object's PlayCount variable to 100. The MediaPlayer object is a Microsoft control that allows a Visual Basic project to easily play MPG movies and other media. By setting the PlayCount to 100, it tells the control to play the loaded movie 100 times before stopping (1002, FIG. 1A).

3. Set bFoundFileToPlay to false. This Boolean variable indicates whether or not the software knows of a valid MPG file to play in the main application window (1004, FIG. 1A).

4. Disable the btnPausePlay button. This grays out the button on the application, disallowing the user from interacting with the MPG movie (1006, FIG. 1A).

5. Create two windows scripting host objects. One is a File System Object (1008, FIG. 1A).

6. Initialize the lpcProcessHeap pointer by calling the API function GetProcessHeap( ). This function returns a pointer to the heap associated with the process that will be created for this application (1010, FIG. 1A).

7. Check to see that the lpcProcessEeap was initialized properly. If not, issue a warning to the user that there was a problem initializing the program, disable the "configure" button on the main window, and exit the function. By exiting the function at this point, the main application window is displayed with only the "Close" button enabled, rendering it essentially useless (1012, FIG. 1A).

8. Find a value for RegistryEntryMPG by querying the registry. This query provides a title and path for the MPG movie that is to be played in the application (1014, FIG. 1A).

9. If RegistryEntryMPG has no value, use the File System Object created earlier to locate the default MPG. This is a movie that is included with the install of this software. If found, set the MPGToPlay variable to this path name. If the registry does return a string, verify that the MPG exists by querying the File System Object. If it exists, assign that path name to the MPGToPlay variable (FIG. 1B).

10. Initialize the four memory consumption rate variables by querying the system registry for assigned (or user determined) values. For each of the four variables, check to make sure that a value was found in the registry. If not, assign a default value, then write this default value to the registry for the next execution (FIG. 1B).

11. Initialize the variable "PausedOrPlaying" to an empty string. Query the system registry for this value. If the registry returns no value, set PausedOrPlaying to "Play". This indicates that the movie will be paused (FIG. 1B).

12. Initialize the variable (FIG. 1B) "MemoryConsumptionRate" to an empty string. Query the system registry for this value. If the registry returns no value, set MemoryConsumptionRate to "none". This indicates that no memory consumption rate has been selected, and that no memory will be consumed once the program begins playing an MPG.

13. If bFoundFileToPlay is set to true, perform the following steps (FIG. 1C):
 a. Set the variable CurrentPos to 0. This indicates the frame of the MPG to be played first. Query the registry for the current position.
 b. On the MediaPlayer object (FIG. 1D), initialize the variable "FileName" to "MPGToPlay". This assigns to the media player the mpg that was found in the registry, or was the default MPG. Also, assign the "CurrentPosition" variable of the MediaPlayer object the value loaded into "CurrentPos". The movie is now loaded into the player, and its current position has been indicated (FIG. 1D).
 c. Now, the software needs to initialize the buttons on the main screen to reflect the options available to the user.
 d. If the movie is paused, do the following (FIG. 1D):
  1. Set the caption of the Play/Pause button to "Play"
  2. Pause the MediaPlayer object, causing the movie to stop playing.
  3. Disable the MemoryTimer object, therefore stopping memory consumption
  4. Enable the Play/Pause button.
 e. If the movie is playing, do the following:
  1. Set the caption of the Play/Pause button to "Pause";
  2. Enable the MemoryTimer object, thereby starting memory consumption;
  3. Enable the Play/Pause button.

14. Display the main window now (FIG. 1D).

This concludes the load event for the main dialog. Once running, the program will call the MemoryTimer function every one second and execute the code enclosed therein.

MemoryTimer function operations outline (FIG. 2A):

First, determine how much memory is to be consumed at this point.

1. Create local variable named BytesToAllocate

2. Use a switch statement to determine the value of the variable MemoryConsumptionRate. It is either "Low", "Medium", "High", "SuperSoak", or "None".

3. If it is "Low", assign the value held in the variable MemRateLow to BytesToAllocate 4. If it is "Medium", assign the value held in the variable MemRateMedium to BytesToAllocate 5. If it is "High", assign the value held in the variable MemRateHigh to BytesToAllocate 6. If it is "SuperSoak", assign the value held in the variable MemRateSuperSoak to BytesToAllocate 7. If it is "None", set BytesToAllocate to zero, and disable the MemoryTimer object.

8. If it is a case not specifically mentioned here, set BytesToAllocate to zero, and disable the MemoryTimer object.

Next, consume the memory (FIG. 2B).

1. If BytesToAllocate has a value greater than zero, call the API function HeapAlloc( ), and pass as it's parameters lpcProcessHeap (the pointer to the process heap acquired in the load function described above), 0, (A set of flags for the function, none of which are used by this program) and the BytesToAllocate variable, indicating how much memory should be allocated.

Exit function.

The following iterates a more specific statement of the figures for Load Events and Memory Timer Function:

FIGS. 1A, 1B, 1C, and 1D illustrate the process for loading an event.

Figure 1B:
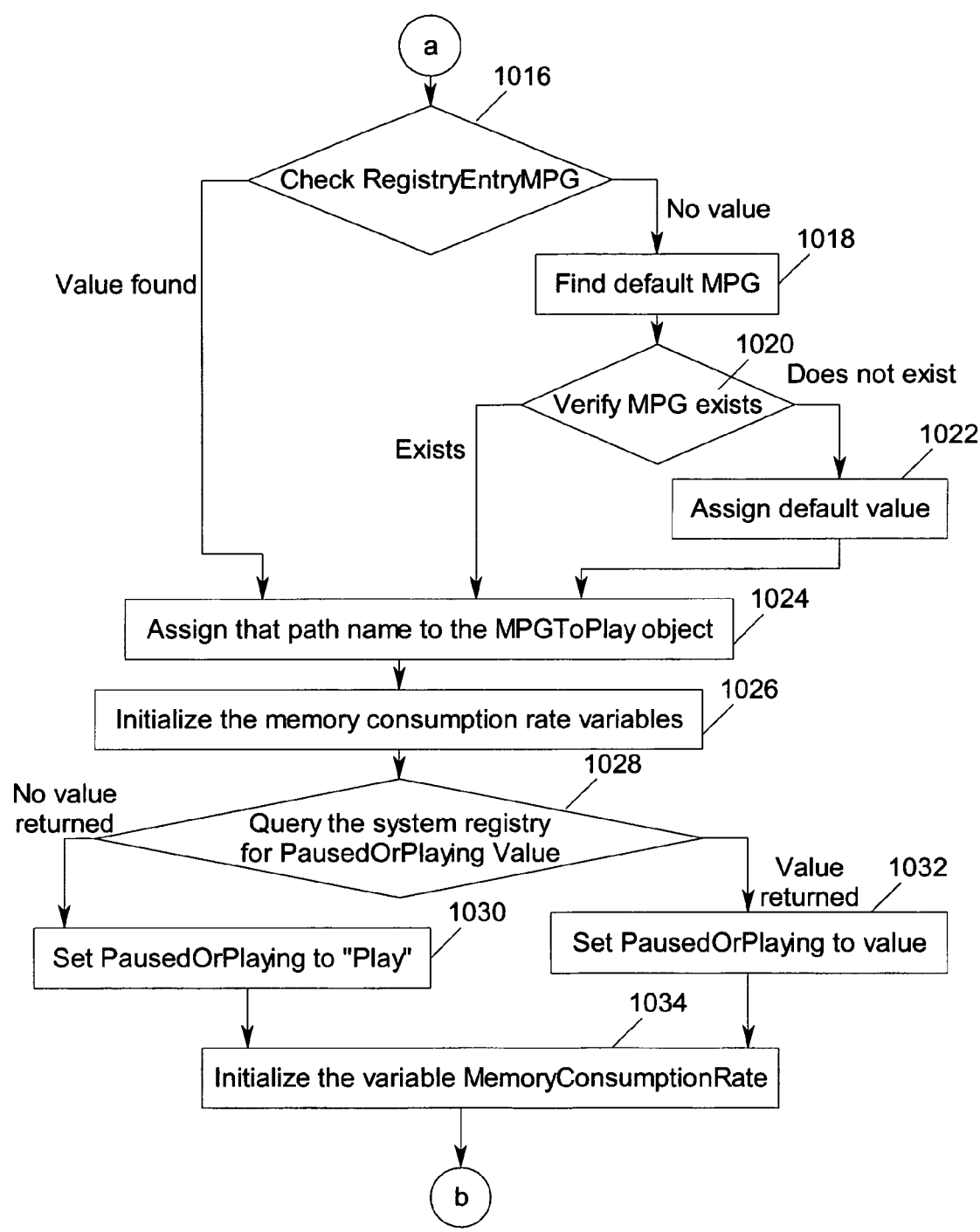
Figure 2A:
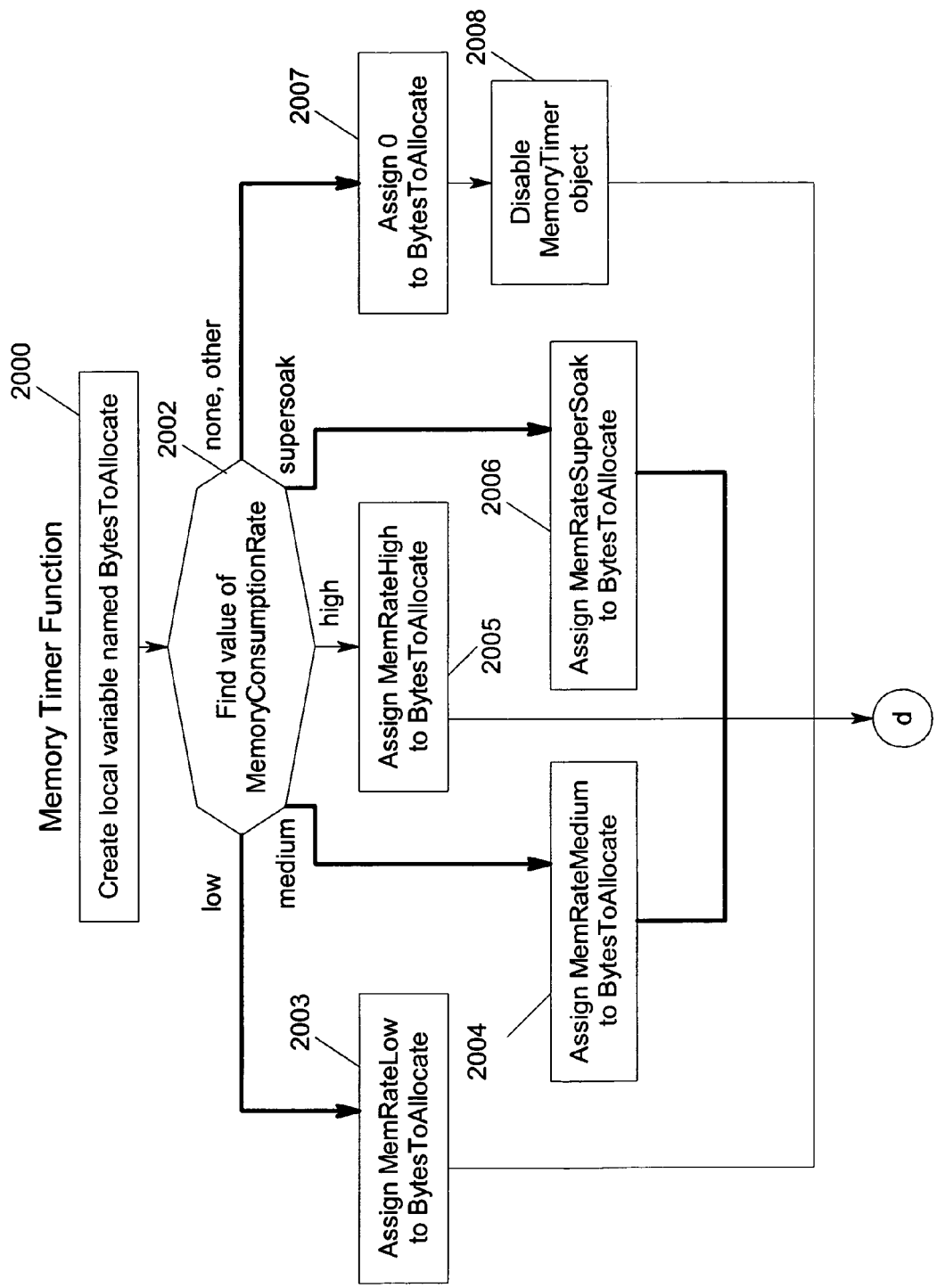
FIGS. 2A, and 2B are flowcharts that show the memory timer function and the processes involved.
Figure 2B:
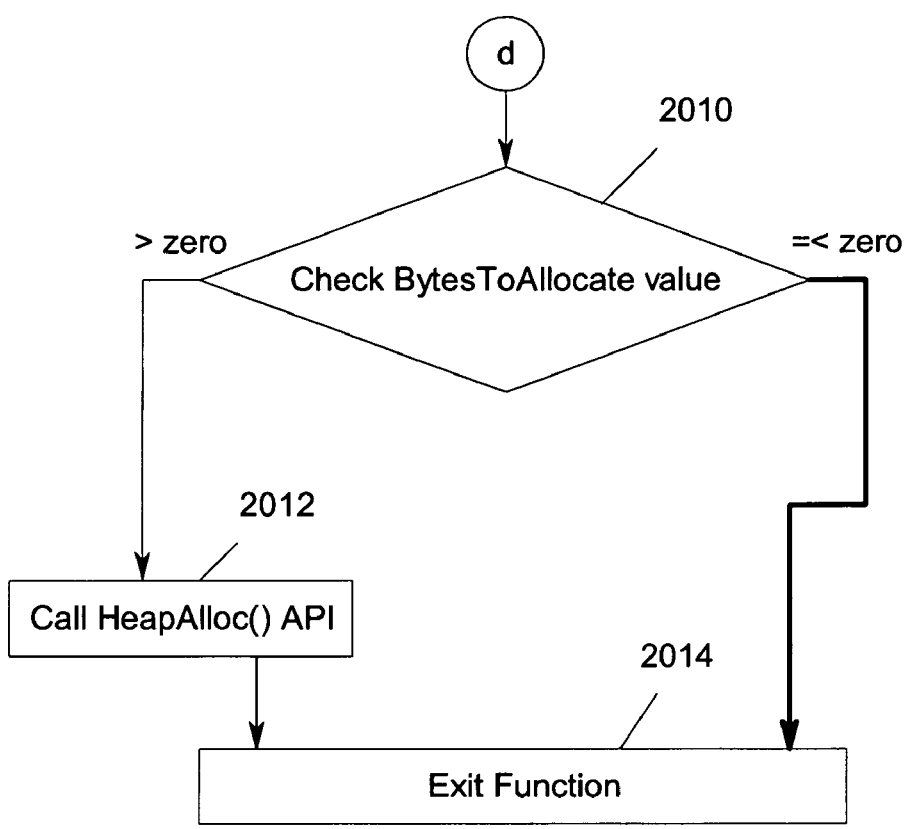
Figure 3:
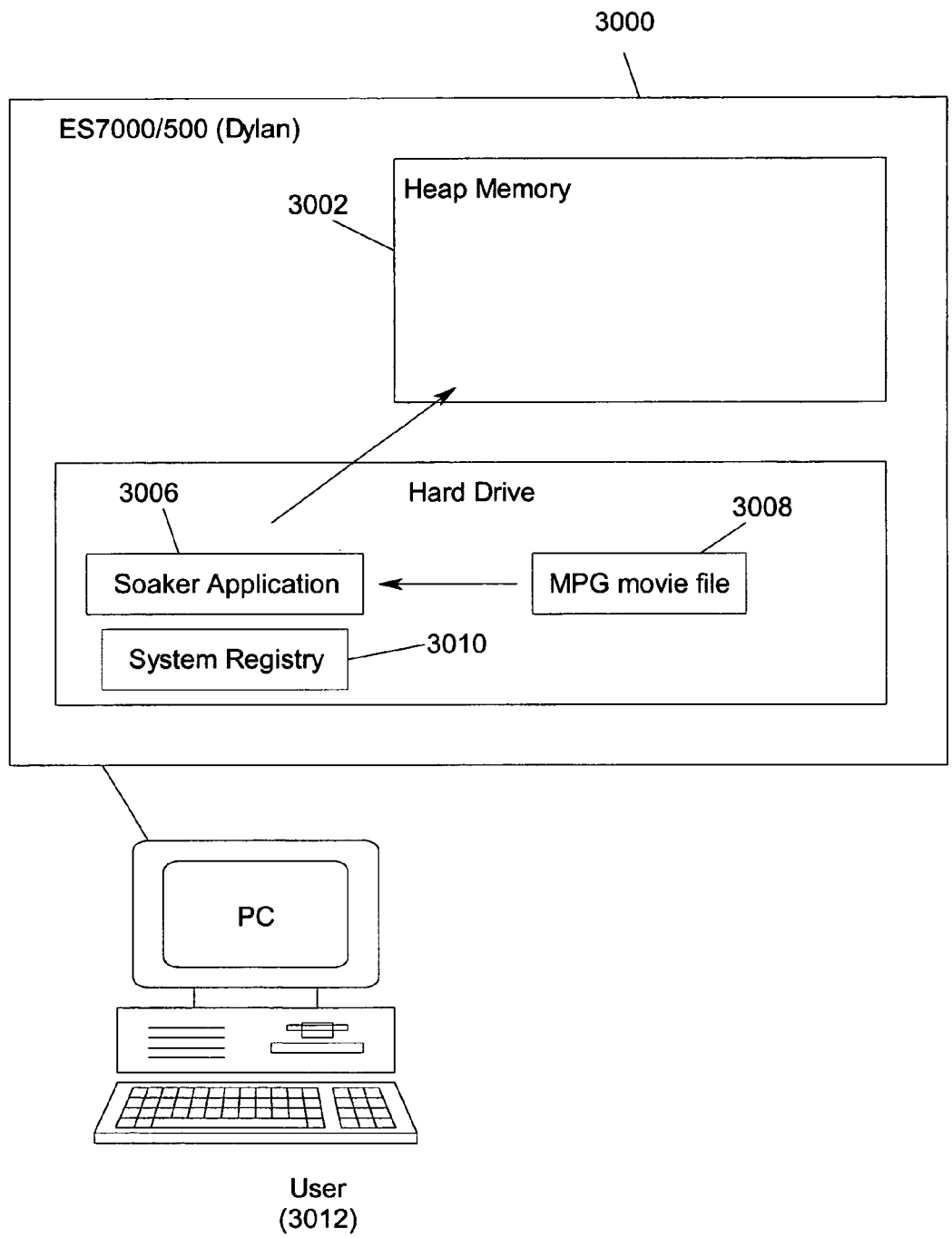
FIG. 3 is a generalized block diagram of the environment in which the method of the present invention operates.

Now referring to FIG. 1A, the MemoryTimer interval is first set (Block 1000), and the MediaPlayer object's PlayCount variable is set to 100 at step 1002. The bFoundFileToPlay variable is set to false (Block 1004), the btnPausePlay button is disabled (Block 1006), and two windows scripting host objects are created at step 1008. The Windows scripting host objects allow the software to manage the MPEG file that is found on the hard drive (FIG. 3). Next, a process to initialize the IpcProcessHeap pointer is initiated at step 1010, followed by a process to check the IpcProcessHeap (Block 1012). The check confirms that a pointer was successfully acquired for the heap memory 3002. If this pointer was not acquired, the software cannot access heap memory, and will not continue. A value for RegistryEntryMPG is found at step 1014, and the process continues to FIG. 1B through connector a. The value inserted into RegistryEntryMPG is the absolute path name of the MPEG file to be played during execution of the software. For example it might read "C:\\mymovies\display\movie1.mpg".

FIG. 1B begins with an inquiry to check the RegistryEntryMPG (Diamond 1016). If a value is not found (No value), the default MPG is found (Block 1018), and an inquiry is made to verify if an MPG exists (Diamond 1020). If a value does not exists (No), a default value is assigned at step 1022, and the process continues to step 1024 and continues through the steps. If a value is found (exists) in inquiry 1020, the process continues to step 1024 to assign that path name to the MPGToPlay object.

If a value is found in inquiry 1016 in the RegistryEntryMPG, that path name is assigned to the MPGToPlay object in step 1024. Next, the memory consumption rate variables are initialized (Block 1026). An inquiry is then made to query the system registry for PausedOrPLaying value (Diamond 1028). If no value is returned, PausedOrPlaying is set to "Play" (Block 1030), and the variable MemoryConsumptionRate is initialized (Block 1034).

If a value is returned at inquiry 1028, PausedorPlaying is set to a value at step 1032, and the variable MemoryConsumptionRate is initialized (Block 1034). The process then continues to FIG. 1C through connector b.

Figure 1C:
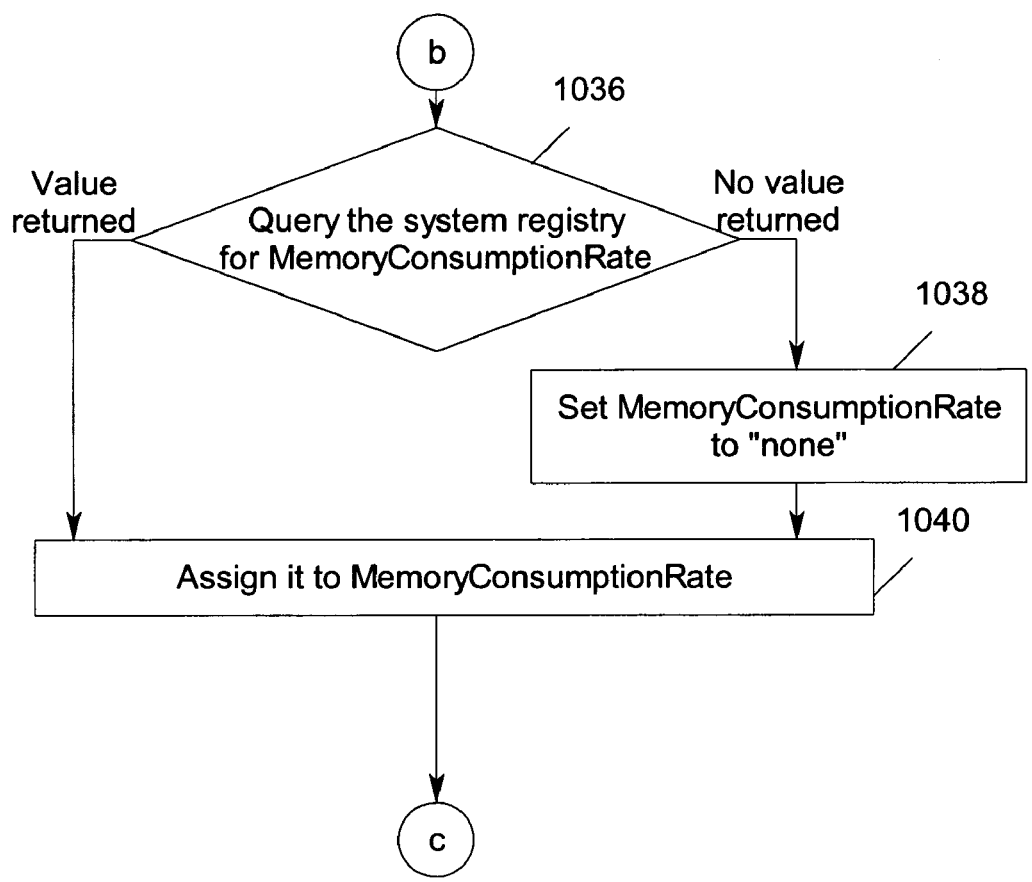
Figure 1D:
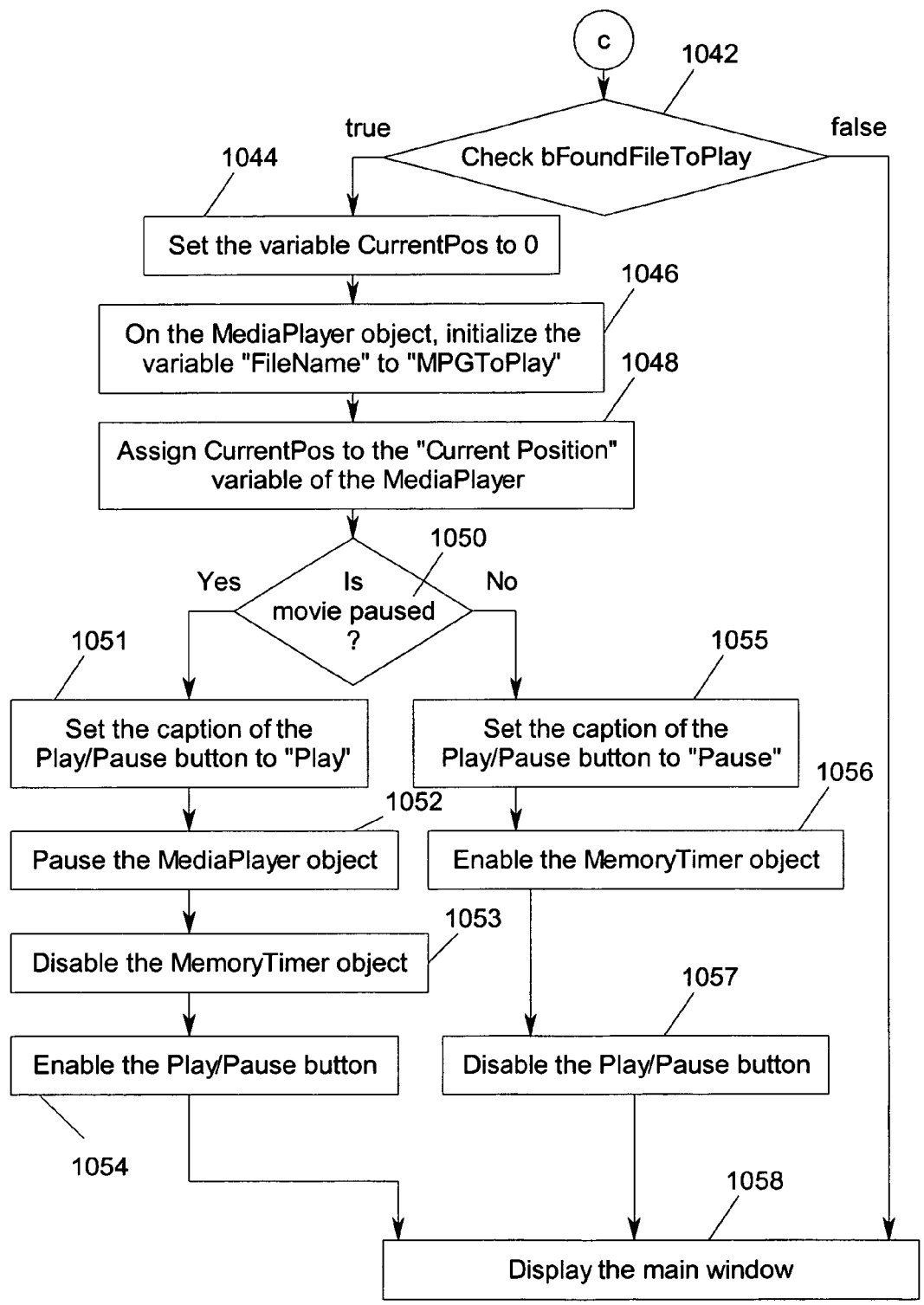

FIG. 1C begins with an inquiry to query the system registry for MemoryConsumptionRate (Diamond 1036). If no value is returned, MemoryConsumptionRate is set to "none" (Block 1038), and assigns it to MemoryConsumptionRate (Block 1040). If a value is returned in inquiry 1036, it is assigned to MemoryConsumptionRate (Block 1040). The process then continues to FIG. 1D through connector c.

FIG. 1D begins with an inquiry to check bFoundFileToPlay (Diamond 1042). If the answer to inquiry 1042 is false, the main window is displayed (Block 1058). If the answer to inquiry 1042 is true, the variable CurrentPos is set to zero (Block 1044), followed by a process to initialize the variable "FileName" to "MPGToPlay" on the MediaPlayer object (Block 1046). Next, the CurrentPos is assigned to the "Current Position" variable of the MediaPlayer at step 1048. An inquiry is then made at step 1050 to check if the movie is paused. If the movie is not paused (No), the caption of the Play/Pause button is set to "Pause" (Block 1055), and the MemoryTimer object is enabled at step 1056. The Play/Pause button is then disabled (Block 1057), and the main window is displayed (Block 1058).

If the movie is paused (Yes to inquiry 1050), the caption of the Play/Pause button is set to "Play" (Block 1051), and the MediaPlayer object is paused at step 1052. The MemoryTimer object is then disabled (Block 1053), and the Play/Pause button is enabled (Block 1054). The main window is then displayed at step 1058.

FIGS. 2A and 2B illustrate the Memory Timer function and the processes involved.

Referring now to FIG. 2A, a local variable named BytesToAllocate is created at step 2000, followed by a process to find the value of MemoryConsumptionRate (Item 2002). For example, this value is set to 100,000 bytes by default if the "low" setting is selected. If the MemoryConsumptionRate is "low", the MemRateLow is assigned to BytesToAllocate (Block 2003), and the MemoryTimer object is disabled (Block 2008). If the MemoryConsumptionRate is "medium", the MemRateMedium is assigned to BytesToAllocate at step 2004, and the MemRateSuperSoak is assigned to BytesToAllocate (Block 2006).

If the MemoryConsumptionRate in FIG. 2A is "high", MemRateHigh is assigned to BytesToAllocate (Block 2005), and the process continues to FIG. 2B through connector d. If the MemoryConsumptionRate is "supersoak", MemRateSuperSoak is assigned to BytesToAllocate (Block 2006). If MemoryConsumptionRate has a value other than that of low, medium, high, supersoak, or does not have a value, BytesToAllocate is assigned zero (block 2007), and the MemoryTimer object is disabled at step 2008, in FIG. 2A.

FIG. 2B continues the Memory Timer function via d if the value of MemoryConsumptionRate is "high". An inquiry is made at step 2010 to check the BytesToAllocate value. If the value is greater than zero, HeapAlloc( ) API is called at step 2012, and the function exits (Block 2014). If the value of BytesToAllocate is lesser than, or equal to zero, the function exits at step 2014.

FIG. 3 illustrates a generalized block diagram and shows the environment for which the method of the present invention is useful. A server operates (3000), for example, as a Unisys ES7000/500, in which a memory heap exists at 3002. Within the hard drive 3004, a soaker application (3006), works to send information to the heap memory 3002. The data from the soaker application 3006 is received from the MPG movie file 3008. A system registry 3010 exists in the hard drive which is used by the soaker application 3006. A user 3012 drives the application process.

Described herein has been a method and system using a Soaker Application which enables a user to predictably apply digital data for consumption by a digital system server at a measurable rate which rate can be adjusted for consumption at selected speeds. This enables a user to determine when a system resource is "over-consuming" resources and becomes a rogue application event, which is then brought to the attention of the user. A video playback mechanism is used for feeding digital data and the system will record the "program state" of the digital feed-in should a shut-down occur. This state can later be re-instituted on resumption of the digital input which will resume at the particular frame were the input was stopped.

While one embodiment of the invention has been described, other variations are possible which still fall within the scope of the attached claims.

What is claimed is:

1. A method, designated as a "soaker application" and operating in a system using multiple applications, for locating applications that are over-consuming memory resources to the detriment of other applications sharing these memory resources, comprising the steps of:
    (a) using said soaker application to consume a pre-determined amount of memory at a pre-determined rate and including the steps of:
        (a1) setting a rate of memory consumption according to a selected choice of low, medium, high, or super high levels of memory consumption in shared memory resources;
        (a2) selecting a time interval within which said selected rate of memory consumption will operate;
        (a3) utilizing an MPEG digital stream of data from a movie as a source of data to be consumed by said memory resources;
    (b) setting a memory threshold value to memory consumption including the step of:
        (b1) initiating a failover action when said memory threshold is reached so that processing is shifted to another node in said system.

2. In a cluster load balancer network, a system for determining the moment of failover from a stalled node to another operating node comprising:
    (a) means to utilize a soaker application to feed digital input data to memory resources shared by a multiple number of operating applications, said means including:
        (a1) means to select the rate of memory consumption per a selected unit time according to the selective choice of the user including the steps of:
            (a1a) means to supply a digital data stream, from a digital movie in MPEG format, for digital data input to said shared memory resources; wherein said means (a1a) to supply digital data includes:

(a1a1) selection means for choosing loading speed rates of low, medium, high, or super speed rates per second;

(a1b) means to pause (stall) said digital input to said shared memory resources;

(a1c) means to record and hold the frame number of said digital movie at the point of closure during stall or stoppage;

(a1d) means to resume said digital data input stream from the exact frame on which it had been paused (stopped, stalled);

(a2) means to recognize a threshold value of memory loading which matches the limitations of the shared memory resources;

(a3) means to initiate a failover of processing operations to an auxiliary node of processors when a stalled mode occurs.

3. The system of claim 2 wherein said selection means (a1a1) includes choice of rates of:

(i) 3000 bytes/second;
(ii) 100,000 bytes/second;
(iii) 5 million bytes/second;
(iv) 10 million bytes/second;
(v) 50 million bytes/second.

4. The system of claim 2 wherein said means (a1b) includes:

(a1ba) means to close down said soaker application.

5. The system of claim 2 wherein said means (a) to utilize includes:

(i) means to record the state of the soaker application when it is closed by the operating system by recording the frame count of the digital movie in MPEG format being played for input.

6. The system of claim 2 wherein said means (a) to utilize a soaker application includes:

(ii) means to record in a system registry whether said soaker application was shut down by a user, by the operating system, or by some other cause.

7. The system of claim 6 which includes:

(iii) means to query said system registry upon a re-launch to find the reason the soaker application program was closed and to re-open said MPEG movie format to the recorded frame position where it had previously been stopped.

* * * * *